(12) United States Patent
Gotliber et al.

(10) Patent No.: US 12,299,956 B2
(45) Date of Patent: May 13, 2025

(54) CALCULATING A DISTANCE BETWEEN A VEHICLE AND OBJECTS

(71) Applicant: AUTOBRAINS TECHNOLOGIES LTD, Tel Aviv-Jaffa (IL)

(72) Inventors: Adi Gotliber, Tel Aviv (IL); Alexander Dikman, Tel Aviv (IL); Jonathan Cohen, Tel Aviv (IL)

(73) Assignee: AUTOBRAINS TECHNOLOGIES LTD, Tel Aviv (IL)

( * ) Notice: Subject to any disclaimer, the term of this patent is extended or adjusted under 35 U.S.C. 154(b) by 415 days.

(21) Appl. No.: 17/819,308

(22) Filed: Aug. 11, 2022

(65) Prior Publication Data

US 2023/0052270 A1 Feb. 16, 2023

Related U.S. Application Data

(60) Provisional application No. 63/363,945, filed on Apr. 29, 2022, provisional application No. 63/363,944, filed on Apr. 29, 2022, provisional application No. 63/260,186, filed on Aug. 11, 2021.

(51) Int. Cl.
*G06V 10/74* (2022.01)
*G06T 7/13* (2017.01)
*G06T 7/80* (2017.01)

(52) U.S. Cl.
CPC ............. *G06V 10/761* (2022.01); *G06T 7/13* (2017.01); *G06T 7/80* (2017.01); *G06T 2207/30256* (2013.01)

(58) Field of Classification Search
None
See application file for complete search history.

(56) References Cited

U.S. PATENT DOCUMENTS

| | | | | |
|---|---|---|---|---|
| 6,535,114 | B1 * | 3/2003 | Suzuki | G06T 7/70 348/148 |
| 2011/0115912 | A1 * | 5/2011 | Kuehnle | G06T 7/80 348/148 |
| 2017/0369057 | A1 * | 12/2017 | Gurghian | G06N 3/08 |
| 2019/0035107 | A1 * | 1/2019 | Neisius | G06T 7/80 |
| 2021/0248392 | A1 * | 8/2021 | Zaheer | G06N 3/08 |

* cited by examiner

*Primary Examiner* — Vikkram Bali
(74) *Attorney, Agent, or Firm* — RECHES PATENTS

(57) ABSTRACT

A method for calculating a distance between a vehicle camera and an object, the method may include: (a) obtaining an image that was acquired by the vehicle camera of a vehicle; the image captures the horizon, the object, and road lane boundaries; (b) determining an initial row-location horizon estimate and a row-location contact point estimate, the contact point is between the object and a road on which the vehicle is positioned; (c) determining a vehicle camera roll angle correction that once applied will cause the lanes boundaries to be parallel to each other in the real world; (d) calculating a new row-location horizon estimate, wherein the calculating comprises updating the row-location horizon estimate based on the vehicle camera roll angle correction; and (e) calculating the distance between the vehicle camera based on a difference between the new row-location horizon estimate and the row-location contact point estimate.

9 Claims, 5 Drawing Sheets

190

(a)

CALCULATING A DISTANCE BETWEEN A VEHICLE AND OBJECTS

BACKGROUND

Autonomous vehicles and/or driver assistance systems are required to determine the locations of lane boundaries.

Autonomous vehicles and/or driver assistance systems are required to perform distance estimations from objects that appear in their surroundings. The distance estimation may be based on the location of the horizon within captured images. The location of the horizon is impacted by the orientation of the vehicle camera that acquired the captured images.

There is a growing need to provide effective horizon estimates and/or lane detection capabilities.

SUMMARY

A method, system and non-transitory computer readable medium for distance calculation.

There may be provided a method for calculating a distance between a vehicle camera and an object, the method may include: (a) obtaining an image that was acquired by the vehicle camera of a vehicle; the image captures the horizon, the object, and road lane boundaries; (b) determining an initial row-location horizon estimate and a row-location contact point estimate, the contact point is between the object and a road on which the vehicle is positioned; (c) determining a vehicle camera roll angle correction that once applied will cause the lanes boundaries to be parallel to each other in the real world; (d) calculating a new row-location horizon estimate, wherein the calculating comprises updating the row-location horizon estimate based on the vehicle camera roll angle correction; and (e) calculating the distance between the vehicle camera based on a difference between the new row-location horizon estimate and the row-location contact point estimate.

The steps (b)-(e) may be are calculated by a vehicle processing circuitry, in real time, and per image.

The calculating of the distance may include calculating point to point distances between points of different road boundaries.

There may be provided a non-transitory computer readable medium for calculating a distance between a vehicle camera and an object, the non-transitory computer readable medium may store instructions for: (a) obtaining an image that was acquired by the vehicle camera of a vehicle; the image captures the horizon, the object, and road lane boundaries; (b) determining an initial row-location horizon estimate and a row-location contact point estimate, the contact point is between the object and a road on which the vehicle is positioned; (c) determining a vehicle camera roll angle correction that once applied will cause the lanes boundaries to be parallel to each other in the real world; (d) calculating a new row-location horizon estimate, wherein the calculating comprises updating the row-location horizon estimate based on the vehicle camera roll angle correction; and (e) calculating the distance between the vehicle camera based on a difference between the new row-location horizon estimate and the row-location contact point estimate.

There may be provided a vehicle processing circuitry that is configured to (a) obtain an image that was acquired by the vehicle camera of a vehicle; the image captures the horizon, the object, and road lane boundaries; (b) determine an initial row-location horizon estimate and a row-location contact point estimate, the contact point is between the object and a road on which the vehicle is positioned; (c) determine a vehicle camera roll angle correction that once applied will cause the lanes boundaries to be parallel to each other in the real world; (d) calculate a new row-location horizon estimate, wherein the calculating comprises updating the row-location horizon estimate based on the vehicle camera roll angle correction; and (e) calculate the distance between the vehicle camera based on a difference between the new row-location horizon estimate and the row-location contact point estimate.

BRIEF DESCRIPTION OF THE DRAWINGS

The embodiments of the disclosure will be understood and appreciated more fully from the following detailed description, taken in conjunction with the drawings in which.

DESCRIPTION OF EXAMPLE EMBODIMENTS

Figure 1:
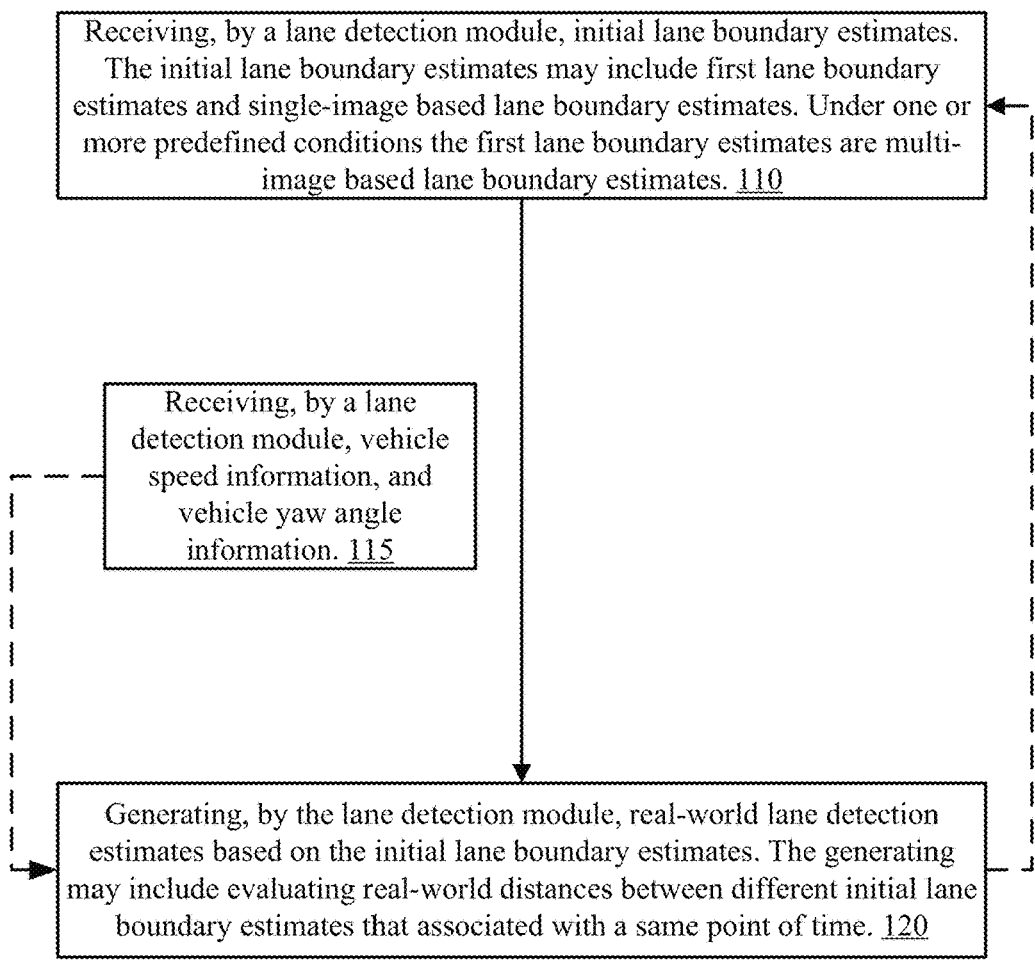
FIG. 1 illustrates an example of a method.

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

Because the illustrated embodiments of the present invention may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

Any reference in the specification to a method should be applied mutatis mutandis to a device or system capable of executing the method and/or to a non-transitory computer readable medium that stores instructions for executing the method.

Any reference in the specification to a system or device should be applied mutatis mutandis to a method that may be executed by the system, and/or may be applied mutatis mutandis to non-transitory computer readable medium that stores instructions executable by the system.

Any reference in the specification to a non-transitory computer readable medium should be applied mutatis mutandis to a device or system capable of executing instructions stored in the non-transitory computer readable medium and/or may be applied mutatis mutandis to a method for executing the instructions.

The specification and/or drawings may refer to an information unit. The information unit may be a sensed information unit. The sensed information unit may capture or may be indicative of a natural signal such as but not limited to signal generated by nature, signal representing human behavior, signal representing operations related to the stock market, a medical signal, audio signal, visual information signal, and the like. Sensed information may be sensed by any type of sensors—such as a visual light camera, or a sensor that may sense infrared, radar imagery, ultrasound, electro-optics, radiography, LIDAR (light detection and ranging), etc.

The specification and/or drawings may refer to a processor. The processor may be a processing circuitry. The processing circuitry may be implemented as a central processing unit (CPU), and/or one or more other integrated circuits such as application-specific integrated circuits (ASICs), field programmable gate arrays (FPGAs), full-custom integrated circuits, etc., or a combination of such integrated circuits.

Any combination of any steps of any method illustrated in the specification and/or drawings may be provided.

Any combination of any subject matter of any of claims may be provided.

Any combinations of systems, units, components, processors, sensors, illustrated in the specification and/or drawings may be provided.

Lane Detection

There may be provide a system, a method, and a non-transitory computer readable medium for lane detection.

Any reference to a lane boundary may be applied mutatis mutandis to a road boundary.

FIG. 1 illustrates method 100 for lane detection.

Method 100 may start by step 110 of receiving, by a lane detection module, initial lane boundary estimates that include first lane boundary estimates and single-image based lane boundary estimates.

Under one or more predefined conditions the first lane boundary estimates are multi-image based lane boundary estimates.

Under one or more other predefined conditions the first lane boundary estimates may be single-image based lane boundary estimates.

At least one of the one or more predefined conditions are based on at least one out of vehicle speed information and the vehicle yaw angle information. For example—velocity that exceed a speed threshold (for example 30, 40, 50, 60, 70, 80, 90 Km/h). Yet for another example—a yaw angle indicative of a sharp and quick turn.

Step 110 may include receiving first lane boundary estimates that were generated by a first lane boundary detector that has a first lane boundary estimation generation rate that depended on at least one of a speed of the vehicle or vehicle yaw angle change rate.

Step 110 may be followed by step 120 of generating, by the lane detection module, real-world lane detection estimates based on the initial lane boundary estimates.

Method 100 may include step 115 of receiving by the lanes model unit vehicle speed information, and vehicle yaw angle information. Step 120 may be also based on the vehicle speed information and the vehicle yaw angle information.

Step 120 may include at least some of the following steps:
a. Evaluating real-world distances between different initial lane boundary estimates that are associated with a same point of time.
b. Generating a given real-world lane detection estimate by determining a relevancy of one or more initial lane boundary estimates based on an age of the one or more initial lane boundary estimates.
c. Ignoring most of the initial lane boundary estimates when the vehicle yaw angle information is indicative of a quick and significant yaw angle change of the vehicle, wherein significant exceeds sixty degrees, and quick is within a time frame of less than a few seconds.
d. Building and updating a lanes model.
e. Checking whether the lanes model is faulty.
f. Resetting the lanes model when finding that the lanes model is faulty.
g. Resetting the lanes model comprising limiting, for a certain period, the real-world lane detection estimates to estimate only two lanes.

Figure 2:
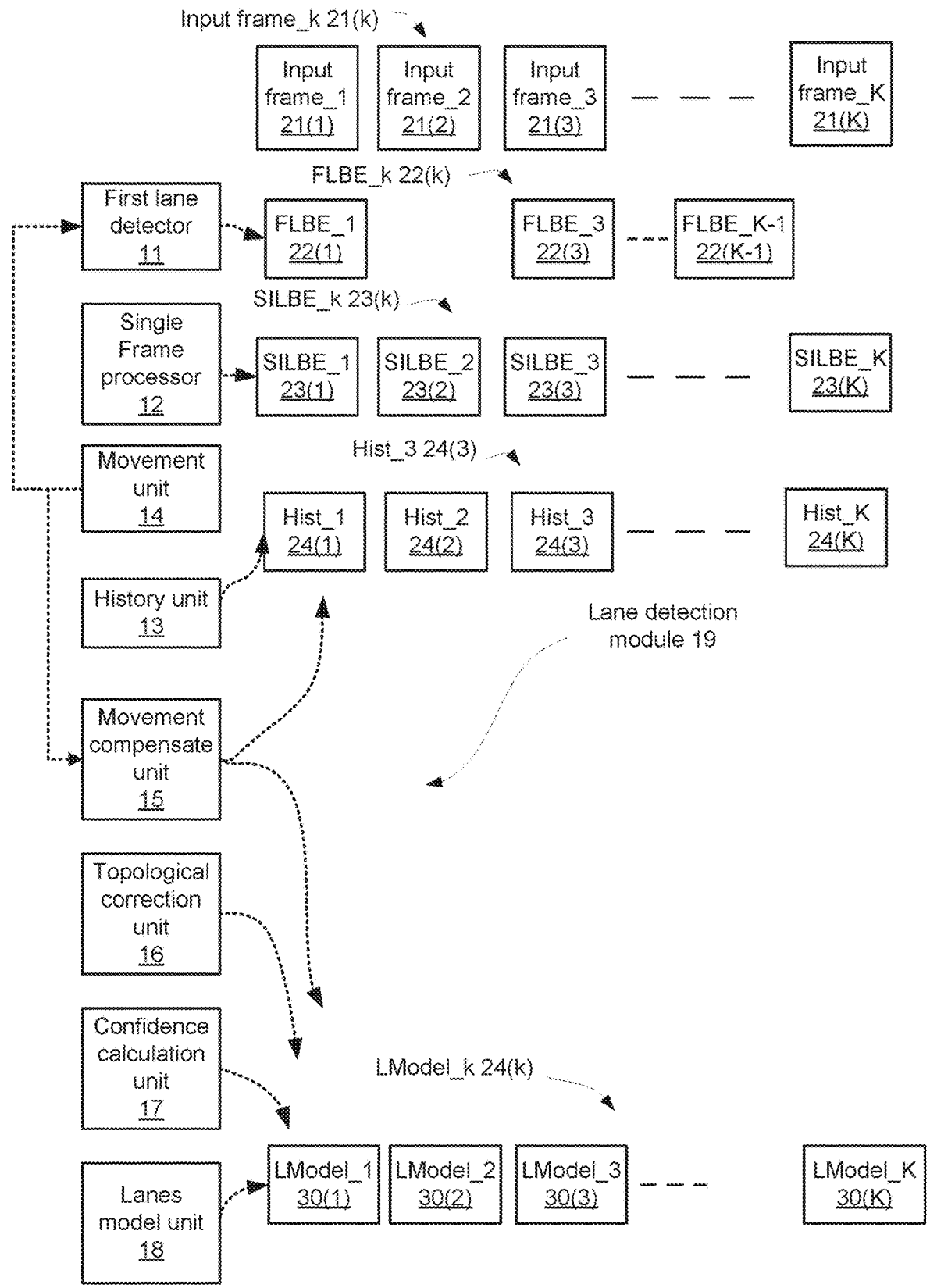
FIG. 2 illustrates an example of data structures and lane estimation entities.

FIG. 2 illustrates various units, modules and data elements.

The data elements include a stream of K (K being a positive integer) images (or frames) that include first, second, third till K'th input frames—input_frame_1 21(1), input_frame_2 21(2), input_frame_3 21(3), till input frame_K 21(K)—whereas for index k that ranges between 1 and K the k'th image is denoted input frame_k 21(k).

The units and the modules may be included in a lanes module 10 that may include first lane detector 11, single frame processor 12, history unit 13, movement unit 14, movement compensation unit 15, topological correction unit 16, confidence calculation unit 17 and lanes model unit 18.

A lane detection module 19 may include the lanes model unit 18 and at least one of movement compensation unit 15, topological correction unit 16, or confidence calculation unit 17.

In FIG. 2 it is assumed that the first lane detector 11 outputs a first lane boundary estimate (FLBE) each two images—see FLBE_1 22(1), FLBE_3 22(3) till FLBE_K−1 22(K−1).

It should be noted that the first lane detector may change the rate of the outputting of its first lane boundary estimate over time and that the rate may range from one first lane boundary estimate per input frame to one first lane boundary estimate per more than one input frames.

The first lane detector 11 may be a convolutional neural network (CNN) or may differ from a CNN.

A FLBE may include lane boundary pixels (pixels that may belong to a lane boundary)—and/or any type of information regarding the lane boundary—such as estimated lane boundaries, and/or equations that represent the lane boundaries, and/or alternative estimated lane boundaries.

The FLBE generated based on one or more input frames may be determined by the first lane detector 11 based on the entire one or more input frames or only a part of the one or more input frames.

The single frame processor 12 outputs one single-image based lane boundary estimate (SILBE) per input frame—see for example SILBE_1 23(1), SILBE_2 23(2), SILBE_3 23(3) till SILBE_K 23(K).

History unit 13 may store and/or update historical information regarding lane boundary estimations.

Movement unit 14 is configured to obtain information regarding a movement of the vehicle—such as velocity and/or yaw angle. The movement unit or another unit may also provide (for example to the first lane detector) information about an angle of the camera.

The history unit 13 may also be configured to manage the history information. For example—apply and/or determine a policy regarding removing older lane boundary points, determining how many lane boundary points to keep, etc. For example—each model point has an age which determinate when this point was added to the model from CNN detector. Age X means that point was added X frames ago. When point age raise a threshold the point is removed from the model.

In FIG. 2 the history information (Hist) is updated once per input frame (see for example Hist_1 24(1), Hist_2 24(2), Hist_3 24(3), till Hist_K 24(K))—but it may be updated once per multiple historic frames.

The history information may include alternative lane boundary estimations line points—that can be used to prevent boundary lane jumping between adjacent (in time) line boundary estimates.

The lane detection module 19 may be configured to perform at least one of polynomial equation fitting and line extrapolation based on equations and road conditions (straight, curved, visible).

Polynomial equation fitting—done by optimizing MSE criterion in order to find the line equation ($X=c_0+c_1 Z+c_2 Z^2+c_3 Z^3$) in world coordinates.

Polynomial degree—when the driving road is straight the coefficient $C_3$ is forced to be 0 (straight road constraint). When the road is curved the coefficient $C_3$ is unconstrained.

Points age—on curved road the age threshold is lower in order to deal with faster changes of road geometry. It should be noted that the decision about road curvature is done based on the ego car angular velocity (one of the IMU signals).

Line extrapolation—when a model line is longer than 100 m and the road is straight the line is extrapolated upon 150 m.

The extrapolation back may also be performed. Namely, if the closest detected point is located 10 m from ego vehicle the line will be extrapolated on range 0 m-10 m, even there are no point detected on this range.

The movement compensate unit 15 may be configured to perform ego car movement compensation. On every input frame aggregated model lane boundary points (of a lane boundary model) may be updated according to the distance covered by the ego vehicle. This may at least partially compensate for gaps in the SILBEs. It may also perform horizon calibration by parallel lines.

Topological correction unit 17 may be configured to detect if a geometry of a lane boundary violence the physical world conditions and fix the lane boundaries. For example:

h. If there is an intersection between lines, the solution is to make one of the lines shorter.
  i. If there is a lane boundary that is detected outside of a road boundary, the system un-confirms the lane boundary.
  j. Check the shape of each lane boundary, if it violates certain rules then un-confirm. The certain rules may reflect traffic regulations, the manner lanes are formed and the like. For example—in the real world a lane of a straight road segment is delimited by two parallel lines then a candidate extra line that is oriented to the two parallel lines and crosses there two parallel lines may be deemed to be a false candidate—and may be ignored of.

The confidence calculation unit 16 is configured to calculate a confidence score of boundary line estimates and for input frame.

k. Boundary line confidence is based on a score provided by the first lane detector, boundary line history and the detected range of the line.
  l. Frame confidence is indicative whether the boundary lines of a road follow a same directions. If those assumptions are violated then a lanes model may be ignored.

The lane detector module 18 is configured to generate and maintain a lanes module that includes lane boundary estimates. The lanes model may include boundary line information generated based on one or more input frames—and may be include aggregated boundary lines.

The lane detector module 18 is configured to:

m. Initialize the lanes model based on certain assumptions.
  n. Use history—such as aggregated boundary lines.
  o. Perform coordinate transform—and transform the frame coordinates (location in image) of boundary line pixels to real world coordinates.
  p. Perform boundary lines matching—between aggregated boundary lines and SILBE boundary lines.
  q. Decide if an aggregated boundary line is confirmed or not based on history of matches/misses.

The lanes model may be initialized and then maintained and updated until being reset—for example when the lanes model is found to be inaccurate (or unreliable) to a predefined degree. Following reset the lanes model may be generated and be trusted when reaching a certain reliability level. Between reset and the trust point the output of the lane boundary detection may be, for example, the SILBEs.

The initialized model may be, for simplicity of operation and for reducing resource consumption, may be limited to a predefined number of lanes—for example for a single right lane and to a single left lane. It should be noted that the predefined number of estimated lanes may exceed two.

The lanes model may output any number of lanes—or may be limited (for saving computational resources) to a predefined number (for example four) of lanes and/or road boundaries.

By using the history—the lanes model may be more robust and reduce changes between lane estimates of consecutive (in time) frames.

The pixels transformation may be done in any manner and may involve replacing image coordinates (x, y) coordinates to real world coordinates (x, z). Real world coordinate x defines a lateral distance according to the ego vehicle, and real world coordinate z defines a longitudinal distance.

The boundary lines matching may occur at any frequency—for example—every time the system receives the update from the first lane detector 11.

The matching may be done in any manner—for example based on the Hungarian algorithm which uses a cost function that is a distance between the lane boundaries of the lanes model and lane boundaries of the SILBEs.

A distance between two lines may be calculated by (a) measuring lateral distances (along x-axis) between two lines in numerous z-coordinates (may filter outliers), and (b) average the lateral distances.

The lanes model unit 18 may then determine if a suggested lane boundary of the lanes model is confirmed or not—for example based on history of matches/misses.

For each suggested lane boundary of the lanes model the history may store a number of hits and misses. A hit is defined as a successful boundary line match, a miss is defined as a failed boundary lines match.

Using the history of matches/misses compensates for false alarms of the SILBEs (a suggested lane boundary of the lanes model is not approved when there are too many misses). The lanes model is more robust to SILBEs misses (a suggested lane boundary of the lanes model is approved even of the current SILBE does not detect the lane boundary—but enough previous matches were found).

The lanes module 10 may apply may have separate flows based on movement and environmental conditions:
r. The ego vehicle speed defines the single frame processor 12 update frequency.
s. A turning of the vehicle may:
 i. Update line equation estimation, allows using higher order boundary lane equations—for example using polynomial equations of at least a third order.
 ii. The lanes module may apply a stricter filtering of a SF line points prior to update.
 iii. A line forward extrapolation is not allowed.
t. Driving lane change
 i. Once a lane change is detected model lines indexes may be updated (LO, RO, etc.) accordingly A Lane change may be detected in different manners—for example—
u. The lateral distance between LO or RO line and ego car center is smaller than 0.1 m. That distance is known from line equation.
v. The mentioned above lateral distance is consistently going down during last 10 frames.

Figure 3:
FIG. 3 illustrates an example of an image.

FIG. 3 illustrates an image 190 on which lane boundaries 191 and road boundaries 192 appear.

Real Time Camera Calibration

There may be provide a system, a method, and a non-transitory computer readable medium for real time camera calibration.

Figure 4:
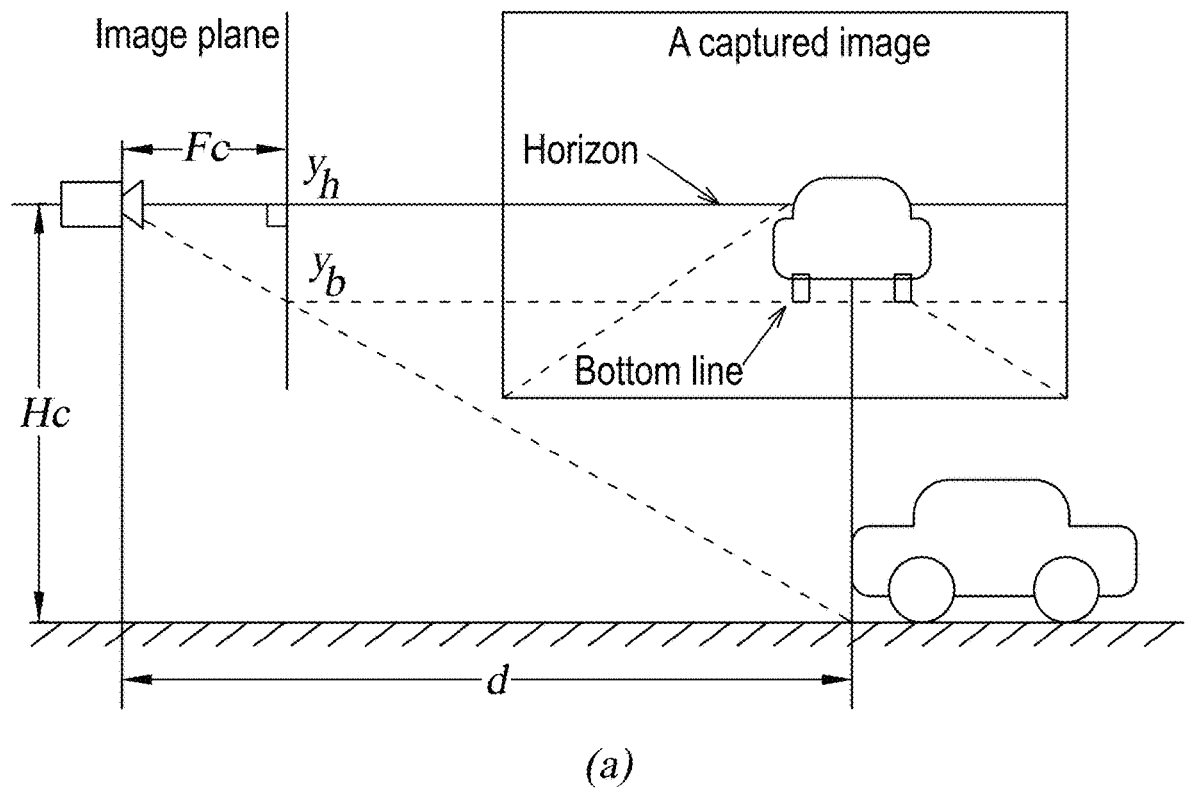
FIG. 4 illustrates an example of a horizon calculation.

FIG. 4 illustrates a prior art equation for calculating a distance between a vehicle camera that captures an image in which an object appears, and the object. In the equation—d is the distance between the vehicle camera and the object, $F_C$ is a distance between the vehicle camera and an image plane, $H_C$ is a distance between the vehicle camera and the road (may be regarded as the height of the vehicle camera), $y_b$ is a line (row) in the image of a point of contact between the object and the road (bottom line), and $y_h$ is a line (row) in the image of the horizon.

The equation is: $d=(F_C-H_C)/(y_b-y_h)$

The prior art solution performs badly if the optical axis of the vehicle camera is not horizontal—where there is a non-zero pitch angle. A positive non-zero pitch angle of the vehicle angle "moves" the horizon downwards in the image while a negative non-zero pitch angle of the vehicle angle "moves" the horizon upwards in the image. These movements may introduce significant errors in the value of $y_h$.

There is a growing need to estimate the non-zero pitch angle of the vehicle camera and this may enable accurate distance estimates.

Figure 5:
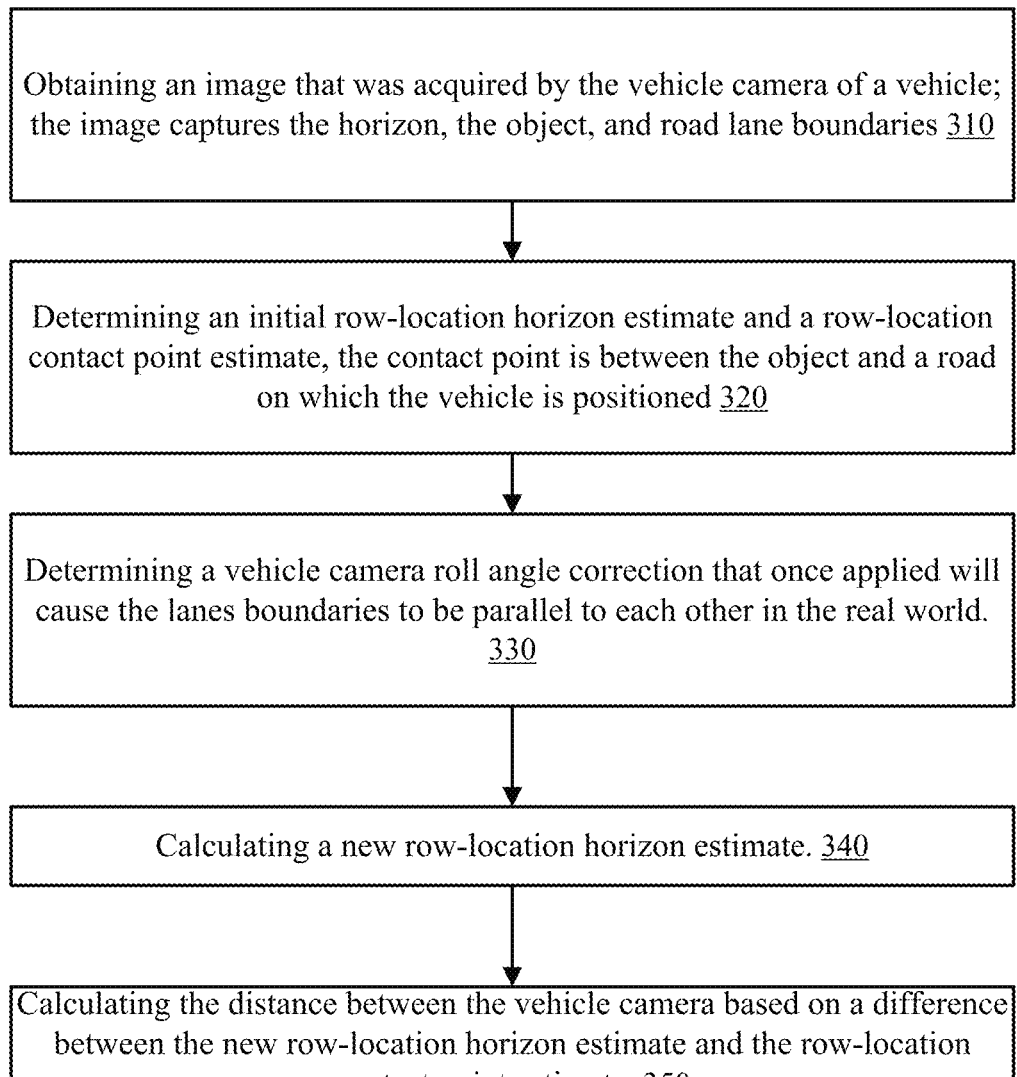
FIG. 5 illustrates an example of a method.

FIG. 5 illustrated an example of a method 300 for calculating a distance between a vehicle camera and an object.

Method 300 may start by step 310 of obtaining an image that was acquired by the vehicle camera of a vehicle; the image captures the horizon, the object, and road lane boundaries.

Step 310 may be followed by step 320 of determining an initial row-location horizon estimate and a row-location contact point estimate, the contact point is between the object and a road on which the vehicle is positioned.

Step 320 may include applying the equation is: $d=(F_C-H_C)/(y_b-y_h)$.

Step 320 may be followed by step 330 of determining a vehicle camera roll angle correction that once applied will cause the lanes boundaries to be parallel to each other in the real world.

Step 330 may be executed in an iterative manner, in an analytical manner and the like.

Since the horizon ($y_h$) is used in the equation $d=(F_C-H_C)/(y_b-y_h)$ it directly affects the coordinates of each line point in the world coordinates. The rest of the parameters in the equation are constant.

Step 330 may be followed by step 340 of calculating a new row-location horizon estimate.

The calculating of the new row-location may include updating the row-location horizon estimate based on the vehicle camera roll angle correction.

Step 340 may be followed by step 350 of calculating the distance between the vehicle camera based on a difference between the new row-location horizon estimate and the row-location contact point estimate.

Steps 320, 330, 340 and 350 may be calculated by a vehicle processing circuitry, in real time, and per image. Thus—they may be calculated tens of times per second.

The following example illustrates various steps that can be applied once per each frame or once for each set of frames (for example once per first lane boundary estimate).

The steps may include transforming pixel (Xim, Yim) coordinates to the world (Xw, Zw) coordinates done with the following equations:
w. For the longitudinal axis, $Zw=(Fc*Hc)/(Yb-Yh)$
x. Where Fc is camera focal length, Hc is camera height, Yh is the vertical coordinates of the horizon and Yb is the vertical coordinates of the lane point (Yim).
y. For the lateral axis, $Xw=(Hc*(Xim-Cx))/(Yb-Yh)$.
z. Where $H_C$ is camera height, Xim is x image, Cx is the center x, Yh is the vertical coordinates of the horizon and Yb is the vertical coordinates of the lane point (Yim).

Initializing the location of the horizon (may be set in advance, may be determined based on previous frames, based on the location of the acquisition of the image, and the like).

Get an estimate of a right lane border and a left lane border.

Determine a lane segment that has both right lane border and left lane border.

Select within the lane segment samples points at multiple distances. For-example select 5, 10, 50, 20 and the like distances (in the real world) and select a right lane border point and left border point per distance.

For each z-axis distance—calculate the (real world) estimated land width (x axis distance) between a right lane border point and left border point of that z-axis distance to obtain multiple estimated lane widths—one estimated lane width per z-axis distance.

Check the validity of each estimated land width (for example whether it is within an expected lane width value).

Calculate, based on the estimated land widths and the z-axis distances between the estimated land widths—lane borders slopes—rate of change of estimated land width over the z-axis.

The amount of horizon correction (y-axis of the image) may be a function of the rate of change of estimated land width over the z-axis—for example may be the rate of change of estimated land width over the z-axis multiplied by a factor (for example 2-20, 6, and the like).

The amount of horizon correction may be clipped—in order to provide a moderate change.

After setting the new horizon—jumping to getting a new estimate of the right lane border and a left lane border.

Any reference in the specification to a method should be applied mutatis mutandis to a system capable of executing the method and should be applied mutatis mutandis to a non-transitory computer readable medium that stores instructions that once executed by a computer result in the execution of the method.

Any reference in the specification to a system and any other component should be applied mutatis mutandis to a method that may be executed by a system and should be applied mutatis mutandis to a non-transitory computer readable medium that stores instructions that may be executed by the system.

Any reference in the specification to a non-transitory computer readable medium should be applied mutatis mutandis to a system capable of executing the instructions stored in the non-transitory computer readable medium and should be applied mutatis mutandis to method that may be executed by a computer that reads the instructions stored in the non-transitory computer readable medium.

Any combination of any module or unit listed in any of the figures, any part of the specification and/or any claims may be provided. Especially any combination of any claimed feature may be provided.

Any reference to the term "comprising" or "having" should be interpreted also as referring to "consisting" of "essentially consisting of". For example—a method that comprises certain steps can include additional steps, can be limited to the certain steps or may include additional steps that do not materially affect the basic and novel characteristics of the method—respectively.

The invention may also be implemented in a computer program for running on a computer system, at least including code portions for performing steps of a method according to the invention when run on a programmable apparatus, such as a computer system or enabling a programmable apparatus to perform functions of a device or system according to the invention. The computer program may cause the storage system to allocate disk drives to disk drive groups.

A computer program is a list of instructions such as a particular application program and/or an operating system. The computer program may for instance include one or more of: a subroutine, a function, a procedure, an object method, an object implementation, an executable application, an applet, a servlet, a source code, an object code, a shared library/dynamic load library and/or other sequence of instructions designed for execution on a computer system.

The computer program may be stored internally on a computer program product such as non-transitory computer readable medium. All or some of the computer program may be provided on non-transitory computer readable media permanently, removably or remotely coupled to an information processing system. The non-transitory computer readable media may include, for example and without limitation, any number of the following: magnetic storage media including disk and tape storage media; optical storage media such as compact disk media (e.g., CD-ROM, CD-R, etc.) and digital video disk storage media; nonvolatile memory storage media including semiconductor-based memory units such as FLASH memory, EEPROM, EPROM, ROM; ferromagnetic digital memories; MRAM; volatile storage media including registers, buffers or caches, main memory, RAM, etc. A computer process typically includes an executing (running) program or portion of a program, current program values and state information, and the resources used by the operating system to manage the execution of the process. An operating system (OS) is the software that manages the sharing of the resources of a computer and provides programmers with an interface used to access those resources. An operating system processes system data and user input, and responds by allocating and managing tasks and internal system resources as a service to users and programs of the system. The computer system may for instance include at least one processing unit, associated memory and a number of input/output (I/O) devices. When executing the computer program, the computer system processes information according to the computer program and produces resultant output information via I/O devices.

In the foregoing specification, the invention has been described with reference to specific examples of embodiments of the invention. It will, however, be evident that various modifications and changes may be made therein without departing from the broader spirit and scope of the invention as set forth in the appended claims.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures may be implemented which achieve the same functionality.

Any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments. Also for example, in one embodiment, the illustrated examples may be implemented as circuitry located on a single integrated circuit or within a same device. Alternatively, the examples may be implemented as any number of separate integrated circuits or separate devices interconnected with each other in a suitable manner.

Also for example, the examples, or portions thereof, may implemented as soft or code representations of physical circuitry or of logical representations convertible into physical circuitry, such as in a hardware description language of any appropriate type.

Also, the invention is not limited to physical devices or units implemented in non-programmable hardware but can also be applied in programmable devices or units able to perform the desired device functions by operating in accordance with suitable program code, such as mainframes, minicomputers, servers, workstations, personal computers, notepads, personal digital assistants, electronic games, automotive and other embedded systems, cell phones and various other wireless devices, commonly denoted in this application as 'computer systems'.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

We claim:

1. A method for calculating a distance between a vehicle camera and an object, the method comprises:
    (a) obtaining an image that was acquired by the vehicle camera of a vehicle; the image captures the horizon, the object, and road lane boundaries;
    (b) determining an initial row-location horizon estimate and a row-location contact point estimate, the contact point is between the object and a road on which the vehicle is positioned;
    (c) determining a vehicle camera roll angle correction that once applied will cause the lanes boundaries to be parallel to each other in the real world;
    (d) calculating a new row-location horizon estimate, wherein the calculating comprises updating the row-location horizon estimate based on the vehicle camera roll angle correction; and
    (e) calculating the distance between the vehicle camera based on a difference between the new row-location horizon estimate and the row-location contact point estimate.

2. The method according to claim 1 wherein steps (b)-(e) are calculated by a vehicle processing circuitry, in real time, and per image.

3. The method according to claim 1 wherein the calculating of the distance comprises calculating point to point distances between points of different road boundaries.

4. A non-transitory computer readable medium for calculating a distance between a vehicle camera and an object, the non-transitory computer readable medium stores instructions for:
    (a) obtaining an image that was acquired by the vehicle camera of a vehicle; the image captures the horizon, the object, and road lane boundaries;
    (b) determining an initial row-location horizon estimate and a row-location contact point estimate, the contact point is between the object and a road on which the vehicle is positioned;
    (c) determining a vehicle camera roll angle correction that once applied will cause the lanes boundaries to be parallel to each other in the real world;
    (d) calculating a new row-location horizon estimate, wherein the calculating comprises updating the row-location horizon estimate based on the vehicle camera roll angle correction; and
    (e) calculating the distance between the vehicle camera based on a difference between the new row-location horizon estimate and the row-location contact point estimate.

5. The non-transitory computer readable medium according to claim 4 wherein steps (b)-(e) are calculated by a vehicle processing circuitry, in real time, and per image.

6. The non-transitory computer readable medium according to claim 4 wherein the calculating of the distance comprises calculating point to point distances between points of different road boundaries.

7. A vehicle processing circuitry that is configured to:
    (a) obtain an image that was acquired by the vehicle camera of a vehicle; the image captures the horizon, the object, and road lane boundaries;
    (b) determine an initial row-location horizon estimate and a row-location contact point estimate, the contact point is between the object and a road on which the vehicle is positioned;
    (c) determine a vehicle camera roll angle correction that once applied will cause the lanes boundaries to be parallel to each other in the real world;
    (d) calculate a new row-location horizon estimate, wherein the calculating comprises updating the row-location horizon estimate based on the vehicle camera roll angle correction; and
    (e) calculate the distance between the vehicle camera based on a difference between the new row-location horizon estimate and the row-location contact point estimate.

8. The vehicle processing circuitry according to claim 7 wherein steps (b)-(e) are calculated in real time, and per image.

9. The vehicle processing circuitry according to claim 7 wherein a calculating of the distance comprises calculating point to point distances between points of different road boundaries.

* * * * *